Aug. 21, 1934.  A. J. N. CHARLIER  1,970,884
DEVICE FOR LUBRICATION OF ENGINES
Filed Sept. 5, 1931
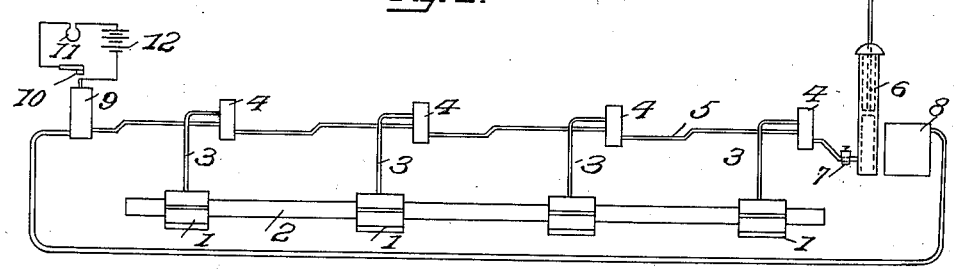
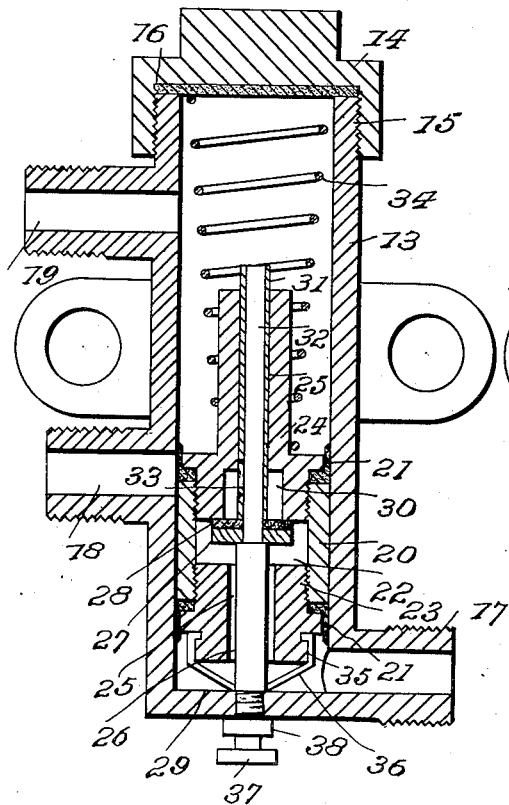
Inventor
A.J.N.Charlier
By
Attorney Patented Aug. 21, 1934

1,970,884

UNITED STATES PATENT OFFICE 1,970,884

DEVICE FOR LUBRICATION OF ENGINES

Albert Jean Nicolas Charlier, Jambes, near Namur, Belgium

Application September 5, 1931, Serial No. 561,467
In Belgium September 9, 1930

10 Claims. (Cl. 184—7)

My invention relates to a device for central lubrication of engines of all kinds and more especially for motorcars.

It has for its object to secure that the distribution of the lubricant should take place in such a manner that each member to be lubricated receives exactly the quantity of lubricant which it needs, whatever may be the number of those members, and also to increase the rapidity of the working whilst applying on each member separately the whole pressure produced on the lubricant, for instance by a pump.

With this object in view, it essentially consists in the special arrangements and combinations of parts hereinafter fully described and pointed out in the appended claims.

On the annexed drawing:

Figure 1 shows diagrammatically the arrangement of the whole of the device and its cooperation with the various members to be lubricated.

Figure 2 is a cross section through one of the distributors making part of the device when they are at rest.

Figure 3 shows the same distributor in the position taken by the piston after the desired quantity of lubricant has been driven towards the member to be greased.

As shown on Figure 1, the different members to be lubricated, for instance the bearings 1 of a transmission shaft 2 are fed with grease under pressure through pipes 3 each connected to a distributor 4. Those distributors, the number of which is equal to the number of the members to be greased or lubricated are interposed in a pipe 5 connected for instance to a pump 6 operated manually by means of a pedal or for instance the motor of a vehicle when the device is applied to a motorcar.

The distributors 4 are connected together in series on the pipe 5 and are constructed in such a manner that the lubricant under pressure driven by the pump 6, when the cock 7 is open, can pass through the different pipes 3 to reach the parts to be lubricated only when the lubrication of the preceding member has taken place in a normal way.

The lubricant after having passed through all the distributors, may eventually be returned to a vessel 8 containing lubricant in reserve. Moreover in the pipe 5, beyond the last distributor 4, is an indicator 9, the construction of which is similar to that of the distributors and which is provided with an electric contact 10 putting into action a signal, for instance a lamp 11, by means of a source of current 12 when the lubricant has passed successively through each of the distributors 4.

If the lubrication of any part by the corresponding distributor 4 has not taken place, the lubricant under pressure, cannot reach the following distributor, the signal will not be energized and faulty operation thus indicated.

The distributors 4 are constructed preferably as shown on Figures 2 and 3. Each comprises a cylindrical vessel 13 closed at its upper part by a plug 14 which is screwed on the threaded part 15 and which is provided with a sealing joint 16. The cylinder 13 is provided with three connections 17, 18 and 19. The connection 17 arranged at the lower part of the cylinder is used for the admission of the lubricant under pressure; the connection 18 connects the cylinder 13 with the pipe 5 for further circulation of the lubricant and the connection 19 connects this cylinder with the part to be lubricated. Between the part to be lubricated and this distributor 4 a back pressure valve (not shown) is interposed, the working of which will be explained further on.

A piston 20 provided with two vacuum cups 21, is adapted to be displaced in the cylinder 13. The piston 20 divides the cylinder 13 into an upper distributing chamber A with which the outlet 19 is always in communication and a lower pressure chamber B with which the inlet 17 for the lubricant under pressure is at all times in communication. The body of the piston 20 is bored so as to form interiorly a chamber 22 hereinafter termed a lubricant chamber closed by two plugs 23 and 24 which are screwed in the chamber 22, the walls of which are threaded to this end. The said plugs 23 and 24 are each provided with a central passage 25. In the passage of the plug 23 a rod 26, carrying a cut-off 27 provided with a sealing member 28 is placed with a certain play. When the piston 20 is in its lowest position, the rod 26 is in contact with the bottom 29 of the cylinder 13 and closes the lower opening of a chamber 30 provided in the upper plug 24 (Figure 2). Moreover, the rod 26 as continued through and beyond the cut-off is of hollow form as at 31 the bore 32 of which is in communication through an opening 33 with the chamber 30 formed in the lower part of the plug 24. A spring 34 bearing against the plug 14 closing the cylinder 13 surrounds the upper part of the plug 24 and is tensioned to maintain the piston 20 normally in its lowest position.

The lower plug 23 carries in a groove 35 plate springs 36 which press on the rod 26 and frictionally maintain it in a given position, when it is displaced with respect to the piston. When the cut-off 28 closes the chamber 30, the upper part of the hollow rod 31 extends a predetermined distance beyond the upper plug 24.

The apparatus works in the following manner:

If it is supposed that a certain number of those distributors are mounted, as hereinabove explained, in the distributing pipe 5 of the lubricant under pressure, the starting of the device takes place as follows:

The cock 7 (Figure 1) is opened and the pump 6 put into motion; the lubricant under pressure passes then to the first distributor 4 and exerts its action on the piston 20. This piston is consequently displaced in the cylinder and the lubricant, which can pass between the rod 26 and the passage 25 formed in the lower plug 23 cannot escape from the chamber 22, the chamber 30 being closed by the cut-off 28.

The piston during its pressure responsive motion, expels through the connecting pipe 19, the pipe 3 and the members to be lubricated, the air contained in the upper part of the cylinder above the piston 20, till the rod 31 which slightly projects above the end of the upper plug 24 contacts with the joint 16 (position shown on Figure 3). As the rod is thus held against further movement while the movement of the piston 20 continues, the cut-off 27 moves relative to and opens the lower end of the chamber 30 to the space 22. The lubricant can thus freely enter the space 30 having in its initial introduction passed between the pipe 25 and the plug 23 and reached the space 22. The lubricant passes through the lateral opening 33 into the pipe 32 which is closed at the upper end by the joint 16. The upward limit of movement of the piston 20 is reached when the upper end of the plug 24 engages the sealing element 16, in which position the lower end of the plug 23 is above the pipe 18, and thus the particular distributor is in open communication with the next distributor in the series. The latter works as the first and the lubricant passes into a third distributor and so on. When the lubricant has reached the last distributor 4 of the series, it passes into the cylinder 9 of the warning device, the piston of which is operated, with the effect to close the contacts 10 and energize the lamp 11. When this signal has indicated that the different distributors are properly functioning, the cock 7 is closed and the pressure is interrupted. The cock 7 having been closed and the pressure on the lubricant relieved, the springs 34 which had been compressed during the displacement of the pistons 20, return the pistons to their original position, simultaneously moving the rods 26 by means of the braking springs 36. During return movement of the pistons 20 to their original positions, the lubricant contained in the cylinder 13 under the piston, flows slowly to the space of the cylinder situated above the piston, entry of air being prevented by the back pressure valve (not shown) interposed in the pipe 3 between the part to be lubricated and the connecting pipe 19. When the pistons have been returned in their lower position (Figure 2) the rods 26, when meeting the bottom of the cylinder 13, return the cut-offs 27 to positions to close the chambers 30. From this moment, the whole of the lubricating device being started, it is only necessary in order to put the device into working, to open the cock 7 and to put into motion the pump 6 so as to have a working similar to that hereinabove described, with this difference however that the lubricant under pressure which comes into the first distributor of the series and which moves the corresponding piston 20, produces the flowing, through the connecting pipe 19 and the pipe 3, of the lubricant contained in the upper part of the cylinder 13 towards the part to be lubricated. No passage of lubricant towards the second distributor is possible till the pipe 18 has been uncovered by the cup 21 of the piston 20. In consequence, if, for instance in view of an obstruction, or of a stopping, the normal lubrication of the first member to be lubricated is prevented, the lubricant under pressure cannot pass to the second distributor. The same working takes place successively for each distributor, till, when the last has worked normally, the lubricant under pressure is adapted to be introduced into the cylinder 9 the piston of which puts into action by its rod the contact 10 which actuates a signal indicating that the system has normally worked.

It will be easily understood, that the quantity of lubricant supplied by each distributor is in relation with the stroke of the corresponding piston. This stroke can be controlled by varying the length according to which the rod 26 projects with respect to the under plug 23. The latter, when meeting the bottom of the cylinder produces the closing of the cut-off 27, rendering impossible any introduction of air into the upper chamber of the cylinder, and limits at the same time the descending movement of the piston 20. By the provision of a series of rods 26 of different lengths, the quantity of lubricant delivered in each operative stroke of the distributor may be readily predetermined and varied. In order, however, that regulation may be provided for without the necessity of using rods 26 of different lengths, with the variable stroke capable of regulation from the exterior of the cylinder, adjustable means may be carried by the cylinder to determine the limit of the downward stroke of the rod 26, such, for example, as the set screw 37 threaded into the lower end of the cylinder in alignment with the rod 26 and adjustable by an exterior head 37 and held in adjusted position by a lock nut 38, as indicated in dotted lines in Figures 2 and 3.

It will be observed that in the device which has been described, it is impossible for one distributor to operate before the preceding one has completely performed its function. The energization of the electric signal indicates that all the parts have been correctly lubricated as the lubricant has circulated successively through the different distributors and has been dispensed by the latter to the different parts to be lubricated.

It is consequently impossible that one of the parts to be lubricated which should oppose a less resistance to the lubricant, can receive the lubricant at the expense of another part, opposing a greater or complete resistance.

Moreover, by reason of the described controlling means, it is possible to quantitatively distribute the lubricant according to the requirements of each of the parts to be lubricated and this distribution takes place under the action of the whole of pressure exerted on the lubricant. It must also be observed that this pressure acts always only on one of the parts to be lubricated.

What I claim is:

1. A lubricant distributor including a cylinder, a piston operative in the cylinder and dividing the cylinder into an upper distributing chamber and a lower pressure chamber, a distributing outlet from the distributing chamber, an inlet to the pressure chamber for the admission of lubricant under pressure, said piston being formed with an interior lubricant chamber at all times open to the pressure chamber and with a pocket above the lubricant chamber, a cutoff closing the pocket with relation to the lubricant chamber in the movement of the piston under the action of the lubricant under pressure, a stem projecting above and below the cutoff, that portion of the stem above the cutoff being hollow and normally open to the pocket and distributing chamber, that portion of the stem below the cutoff passing loosely through the piston to establish communication between the pressure chamber and lubricant chamber, the limit movement of the piston under the pressure in the pressure chamber serving to close the hollow stem against the distributing chamber and open the cut-off, means for operating the piston in a direction opposite to that incident to pressure in the pressure chamber, said cut-off being closed at the limit movement of said piston under said means and means carried by the piston to engage the latter portion of the stem to hold the same against movement in response to the pressure of the lubricant in the pressure chamber.

2. A lubricant distributor including a cylinder, a piston operative in the cylinder and dividing the cylinder into an upper distributing chamber and a lower pressure chamber, an outlet from the distributing chamber leading to the point of lubricant application, an inlet to the pressure chamber leading from a source of lubricant under pressure, a lubricant chamber formed within the piston, a pocket formed in the piston above the lubricant chamber, a cut-off between the lubricant chamber and the pocket, a stem extending above and below the cut-off and adapted in the movement of the piston to engage the respective ends of the cylinder to operate the cut-off, the stem above the cut-off being hollow and open at its upper end and formed with an opening at all times in communication with said pocket, that portion of the stem depending from the cut-off passing loosely through the piston to permit passage of the lubricant between such lower portion of the stem and piston in all movements of the piston, and means for operating the piston toward the pressure chamber after pressure in the inlet is relieved, the piston moving in response to pressure in the pressure chamber causing lubricant above the piston to be discharged from the outlet, continued movement of the piston causing contact of the stem with the top of the cylinder to close the upper end of and arrest movement of the stem, the further continued movement of the piston causing the cut-off to be opened to thereby establish communication between the lubricant chamber and pocket, the movement of the piston responsive to said means causing flow of lubricant from the pressure chamber through the lubricant chamber, the pocket and the hollow stem to the distributing chamber in succession, the continued movement of the piston causing movement of the stem to be arrested with continued movement of the piston causing the cut-off to interrupt communication between the lubricant chamber and pocket.

3. A lubricant distributor including a cylinder, a piston in the cylinder dividing the cylinder into a distributing chamber and a pressure chamber, an outlet leading from the distributing chamber, an inlet leading to the pressure chamber and in communication with a source of lubricant under pressure, said piston including a lubricant chamber open at all times to the pressure chamber, a pocket beyond the lubricant chamber toward the outlet, a cut-off operative to cut off communication between the pocket and the lubricant chamber, means connected to the cut-off and establishing communication between the pocket and the distributing chamber, said means, in the final portion of the movement of the piston toward the inlet, by pressure in the pressure chamber, being operated by a wall of the cylinder to open the cut-off and close communication between the pocket and distributing chamber, means for moving the piston toward the inlet on relief of pressure in the pressure chamber, and means carried by the piston to be engaged and operated by a wall of the cylinder during the final portion of the movement of the piston toward the inlet to close the cut-off and prevent communication between the lubricant chamber and pocket.

4. A lubricant distributor comprising a cylinder, a piston in the cylinder dividing the cylinder into a distributing chamber and a pressure chamber, an outlet leading from the distributing chamber, an inlet leading to the pressure chamber and in communication with a source of lubricant under pressure, said piston including a lubricant chamber at all times open to the pressure chamber, a pocket formed in the piston beyond the lubricant chamber toward the outlet, and means carried by the piston for operating the cut-off relative to the pocket at the extreme limits of movement of the piston, said means operating at the limit of movement of the piston toward the outlet to open the cut-off with respect to the pocket and operating at the extreme limit of movement of the piston toward the inlet to close the cut-off with respect to the pocket, said means providing a passage to establish communication between the pocket and distributing chamber in all positions of the piston except at the extreme limit of movement of the piston toward the outlet, said passage being closed to interrupt communication between the pocket and distributing chamber at the extreme limit of movement of the piston toward the outlet, whereby during piston movement from the inlet toward the outlet by pressure in the pressure chamber, the pocket is closed to the lubricant chamber and open to the distributing chamber, and during movement of the piston from the outlet toward the inlet upon relief of pressure in the pressure chamber, the pocket is in communication with the lubricant chamber and with the distributing chamber.

5. A construction as defined in claim 4, including an outlet formed in the cylinder and leading to a second distributor, said outlet being normally closed by the piston and placed in communication with the pressure chamber when the piston has reached a final position in movement toward the outlet.

6. A lubricant distributor including a cylinder closed at its ends, a piston operative in the cylinder and dividing the cylinder into a distributing chamber and a pressure chamber, a lubricant outlet from the distributing chamber, a lubricant inlet for the pressure chamber, means for admitting lubricant under pressure to the pressure chamber through said inlet, said lubricant under pressure tending to move the piston toward the outlet, means for moving the piston toward the inlet in the absence of pressure in the pressure chamber, said piston being formed with a lubricant chamber intermediate its ends and open at all times to the pressure chamber, a pocket formed in the piston beyond the lubricant chamber toward the outlet of the cylinder, a cut-off for controlling the communication between the lubricant chamber and the pocket, means connected to the cut-off and movable in the piston to normally establish communication between the pocket and the distributing chamber, said means being engaged by the end wall of the cylinder immediately preceding the limit of movement of the piston toward the outlet to cut off communication between the pocket and distributing chamber, the further movement of the piston toward the outlet serving through said engagement to operate the cut-off to establish communication between the lubricant chamber and pocket, means operative in the piston and engaged by the end wall of the cylinder immediately preceding the limit of movement of the piston toward the inlet, said latter means operating on the further movement of the piston toward the inlet to operate the cut-off to close communication between the pocket and lubricant chamber, and means carried by the piston to maintain the cut-off in position to prevent communication between the lubricant chamber and pocket during movement of the piston from the inlet toward the outlet.

7. In a distributor, a cylinder having an inlet at one end and an outlet at the opposite end, a piston operative in the cylinder, the space at the outlet end of the cylinder beyond the piston constituting a distributing chamber and having open communication with a point of lubricant deposit, that portion of the cylinder at the inlet end of the cylinder in front of the piston serving as a pressure chamber and being open to a source of lubricant under pressure, said piston being moved toward the outlet upon a discharge stroke by the pressure in the pressure chamber, spring means for moving the piston toward the inlet upon relief of pressure in the pressure chamber, said piston being interiorly formed with a lubricant chamber, a pocket beyond the lubricant chamber, a cut-off operative to cut off communication between the pocket and the lubricant chamber, a stem extending from the cut-off and passing loosely through the piston to thereby provide constant communication between the lubricant chamber and pressure chamber, a hollow stem extending from the cut-off and normally open to the distributing chamber, said hollow stem being always in communication with the pocket, the stem projecting beyond the piston to be engaged by the respective ends of the cylinder in the discharge and return movements of the piston to thereby actuate the cut-off, and the hollow stem being closed by the end wall upon engagement therewith, further movement of the piston causing the cut-off to be opened.

8. In a distributor, a cylinder having end walls, a piston operative in the cylinder, with the space above the piston constituting a distributing chamber and the space below the piston constituting a pressure chamber, an outlet leading from the distributing chamber, an inlet leading to the pressure chamber and in communication with a source of lubricant under pressure, said piston being formed intermediate its ends to provide a lubricant chamber, a pocket formed in the piston beyond the lubricant chamber toward the outlet, a hollow stem having a non-leaking sliding connection with the piston and open at the end toward the distributing chamber, said hollow stem being in open communication with the pocket at all times, a cut-off carried by the stem and operative to control communication between the pocket and lubricant chamber, a second stem slidable in the piston below the cut-off and fitted to permit communication about said stem between the pressure chamber and lubricant chamber at all times, the movement of the piston toward the outlet by pressure in the pressure chamber moving the hollow stem into end-closing contact with the cylinder, the further movement of the piston toward the outlet compelling relative movement of the hollow stem to operate the cut-off to establish communication between the lubricant chamber and pocket, means for moving the piston towards the inlet upon relief of pressure in the pressure chamber and in such movement by-passing lubricant past the piston from the pressure to the distributing chamber and compelling end engagement of the second stem with the cylinder and compelling said second stem on further movement of the piston in the same direction to close the cut-off to prevent communication between the lubricant chamber and pocket, and means carried by the piston to maintain the cut-off in position to prevent communication between the lubricant chamber and pocket during full piston movement toward the outlet to a point where the open end of the hollow stem engages the wall of the cylinder.

9. In a distributor, a cylinder having end walls, a piston operative in the cylinder, with the space above the piston constituting a distributing chamber and the space below the piston constituting a pressure chamber, an outlet leading from the distributing chamber, an inlet leading to the pressure chamber and in communication with a source of lubricant under pressure, said piston being formed intermediate its ends to provide a lubricant chamber, a pocket formed in the piston beyond the lubricant chamber toward the outlet, a hollow stem having a non-leaking sliding connection with the piston and open at the end toward the distributing chamber, said hollow stem being in open communication with the pocket at all times, a cut-off carried by the stem and operative to control communication between the pocket and lubricant chamber, a second stem slidable in the piston below the cut-off and fitted to permit communication about said stem between the pressure chamber and lubricant chamber at all times, the movement of the piston toward the outlet by pressure in the pressure chamber moving the hollow stem into end-closing contact with the cylinder, the further movement of the piston toward the outlet compelling relative movement of the hollow stem to operate the cut-off to establish communication between the lubricant chamber and pocket, means for moving the piston toward the inlet upon relief of pressure in the pressure chamber and in such movement by-passing lubricant from the pressure to the distributing chamber and compelling end engagement of the second stem with the cylinder and compelling said second stem on further movement of the piston in the same direction to close the cut-off to prevent communication between the lubricant chamber and pocket, and means carried by the piston to frictionally engage the second stem and maintain it in operated position.

10. A construction as defined in claim 9, wherein the cylinder is formed with a second outlet intermediate the inlet and first mentioned outlet, with said second outlet open to direct communication with the pressure chamber when the piston has reached its limit of operative movement toward the outlet leading from the distributing chamber, said second outlet being otherwise closed against communication with the pressure chamber by the piston.

ALBERT JEAN NICOLAS CHARLIER.